United States Patent [19]
Stromblad

[11] 3,805,544
[45] Apr. 23, 1974

[54] DEVICE IN REFRIGERATING CONTAINERS AND SIMILAR MOBILE COOLING OR REFRIGERATING RECEPTACLES

[75] Inventor: Jan Stellan Stromblad, Jonkopling, Sweden

[73] Assignee: Aktiebolaget Svenska Flaktfabriken, Nacka, Sweden

[22] Filed: Dec. 1, 1971

[21] Appl. No.: 203,618

[30] Foreign Application Priority Data
Dec. 1, 1970  Sweden.......................... 16222/70

[52] U.S. Cl..................... 62/413, 62/407, 62/414, 62/418, 62/419
[51] Int. Cl............................................. F25d 17/04
[58] Field of Search......... 62/407, 418, 419, 89, 97, 62/413, 414, 415, 416

[56] References Cited
UNITED STATES PATENTS
| | | | |
|---|---|---|---|
| 1,296,968 | 3/1919 | Klein | 62/97 |
| 2,506,448 | 5/1950 | Gregor | 62/414 |
| 2,678,546 | 5/1954 | Campbell | 62/414 |
| 1,973,022 | 9/1934 | Strobell | 62/407 |
| 2,206,631 | 7/1940 | Clark | 62/418 |
| 2,350,249 | 5/1944 | Osborn | 62/419 |
| 2,696,086 | 12/1954 | Jones | 62/418 |
| 2,780,923 | 2/1957 | Jones | 62/419 |
| 3,092,220 | 6/1963 | Black | 62/419 |

FOREIGN PATENTS OR APPLICATIONS
477,141  1/1953  Italy.......................... 62/419

*Primary Examiner*—William J. Wye
*Attorney, Agent, or Firm*—Holman & Stern

[57] ABSTRACT

In refrigerating receptacles of the kind having a cargo compartment and at one of its ends refrigerating machinery from which cooled air, via channels arranged between the receptacle roof and a subroof defining the upper wall of the cargo compartment, is introduced through openings in the subroof into the cargo compartment, there is provided in the subroof at the primary portion of said channels, openings for injecting the warmer air of the cargo compartment into the cold air in the channels in order to reduce transmission losses through the receptacle roof and to prevent cold air being introduced to the cargo through the other subroof openings.

2 Claims, 2 Drawing Figures

DEVICE IN REFRIGERATING CONTAINERS AND SIMILAR MOBILE COOLING OR REFRIGERATING RECEPTACLES

BACKGROUND OF THE INVENTION

Using air as a cold carrier in the transport of cold is known in the art. In order to obtain a uniform cooling of the cargo space and of the cargo therein, the cold carrier media, the air must be uniformly distributed over the used cargo volume. When flowing freely, air will, as is known, follow the slightest resistance and the risk of an uneven temperature distribution is thereby great, if the air distribution in the cargo space is dependent on the cargo stowage. In conventional refrigerating containers, the air is led from the refrigerating machinery through a channel at the bottom of the container into the cargo space through the cargo and back to the cooling machinery via an outlet in the upper part of the container. This method gives a uniform distribution of the cold and a good air percolation through the cargo, when the container is fully loaded. If, however, the space is only partially filled with cargo, which contacts the floor, the greater resistance, which will appear where the cargo is located, will cause the air to flow through the part of the floor where it is not loaded, as the resistance there will be less. Hence the percolation will be deteriorated and the distribution of the cold will be limited substantially to the unloaded part of the container floor resulting in a reduced cooling.

In order to obtain an improved guidance of the cooled air introduced into the cargo space, it has earlier been suggested to introduce the cooled air into the cargo compartment from the upper part thereof, whereupon the air is allowed to pass down through the cargo in order to be transported back to the suction side of the blower from the bottom of the container.

In order to guarantee that the cargo is entirely percolated by the cooled air, the sidewalls of the cargo space preferably are provided with vertical air slots, which open against the compartment, and the bottom of the cargo compartment is provided with a flooring which spaces the cargo from the floor and forms channels which communicate with the suction side of the blower.

Due to this design of the cargo compartment and due to the fact that the cooled air is introduced from the container roof, a good percolation and thereby also an even cooled distribution will be obtained independent of the filling rate of the container. This depends that upon the cargo in practice never being stowed up to the double roof, so that the cargo cannot seal off the inlet orifices for the air as in a container having the air introduced from the bottom.

As a consequence of the above mentioned measures there, however, arises new problems, which consist in the cooled air, which is introduced in the cannels at the upper part of the container having such a low temperature that cold susceptible cargo which is stowed at the upper part of the container may be damaged. Furthermore, the generally large temperature difference between the air in those channels and the air outside the container will result in large power losses due to heat transmission from the outside of the container to the channels. This last mentioned drawback may be influenced but cannot be eliminated by improved insulation of the outer roof.

SUMMARY OF THE INVENTION

The object of the present invention is to eliminate the above drawbacks and the invention is characterized substantially in that the subroof is provided with openings designed to inject the warmer air of the cargo compartment into the cooled air flowing through the channels. Due to this arrangement, there is obtained a reduced heat transmission through the container roof, less cold inlet air into the upper part of the cargo compartment and an increase of the air volume circulating in the container.

In order to further increase the equalization of the temperature difference between the channels and the cargo compartment, it is, according to the invention, also suggested that the subroof of the container be manufactured of a material which is so adapted that the temperature of the air flowing in the channels increases due to heat transmission from the warmer air below the subroof.

The end wall of the cooling container situated opposite to the cooling machinery, furthermore, is provided with openable loading ports having an insulation which is not equivalent to the insulation of the other walls of the container. The cargo in this portion of the cargo compartment will thus be less cooled.

In order to eliminate this drawback, it is, according to the invention, also suggested that the flow orifices of the subroof located nearest to the openable ports in the cargo space be designed with a larger flow area than the other flow orifices of the subroof.

DESCRIPTION OF THE PREFERRED EMBODIMENT

Figure 1:
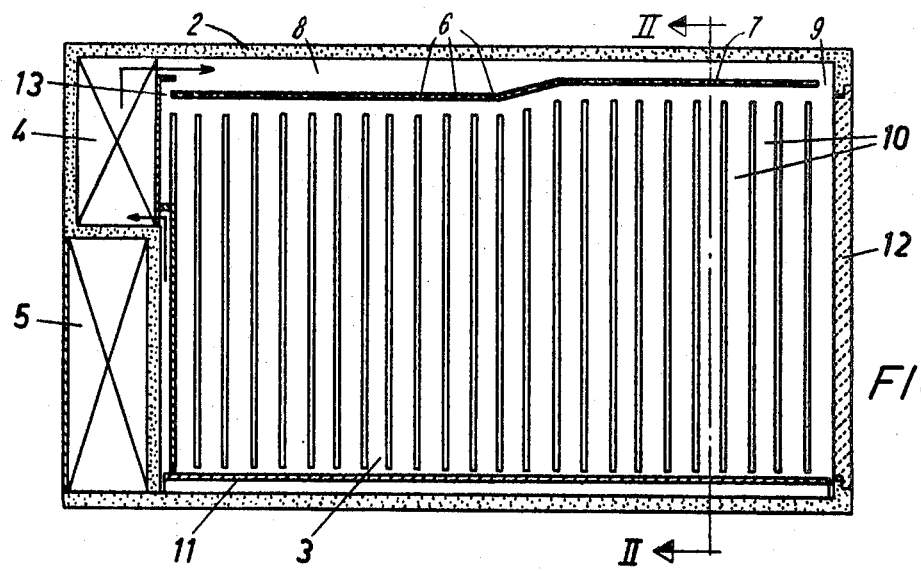
FIG. 1 is a view in longitudinal section through a container.

A container 1 comprises a cargo compartment 3 surrounded by an insulating shell 2. At one end, the container is provided with cooling machinery 4 having a blower, with said machinery being located within the insulating shell, and below the cooling part, there is located a driving means 5 outside the insulating shell. The cargo space is provided with a subroof 7 having inlet openings or flow orifices 6 of suitable shape.

Figure 2:
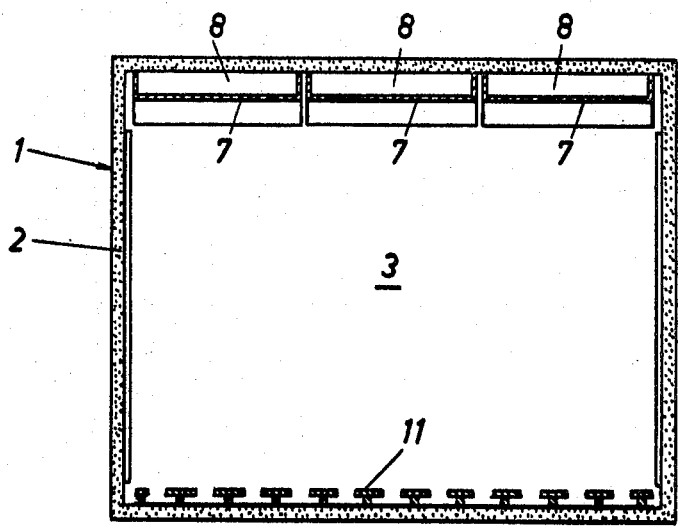
FIG. 2 is a view taken along line II—II of FIG. 1, the view looking in the direction of the arrows.

As can be seen from FIG. 2, the subroof 7 in the example shown is composed by three separate traylike units which form inlet channels 8, with said channels having a lower section height at a door 12 than at the machinery side. The inlet channels 8 may have a greater or lesser design and may be present in another number. The flow orifices in the subroof are preferably evenly spaced and the subroof is provided with one or more larger flow orifices 9 at locations at which a heavier circulation is required e.g. at the container door. The side walls of the cargo compartment are provided with vertical air slots 10 which open against the compartment. On the container floor, there is placed a flooring 11 preferably in the form of T-profiles of a suitable material, located in the longitudinal direction of the container, and the profiles space the cargo from the floor, thereby forming channels for the air leaving the compartment. The cooled air is circulated through the container as shown by the arrows in FIG. 1, and the introduction of air takes place at the container roof and the outlet at the lower part of the refrigerated space.

In the example shown, the subroof 7 is provided with openings 13 at the portions where the channels 8 begin, with said openings being so formed that a subpressure tends to occur at the upperside of the opening when the cooled air flows into the channels. Owing to this, the warmer air in the cargo compartment is sucked out through these openings 13 and is injected into the cooled inlet air. The subroof 7 is manufactured of a material affording a good heat transmission from the cargo compartment to the channels, whereby the temperature of the cooled inlet air is increased at the same time as heat is transferred away from the cargo compartment. This has favorable influence on the reduction of the heat transmission through the outer roof of the container as the temperature of the cooled air will have less deviation from the ambient temperature than in a case in which the subroof is designed in a conventional way.

In a container according to the invention, there is obtained a cold air distribution giving an even temperature distribution in the cargo independent of the location or stowage of the cargo and independent of the location of the ports without the necessity of arrangements causing a pressure drop, whereby the air can flow through as well as around the cargo. The cooled air may be distributed upon necessity i.e. the flow of the cooled air may be so guided that more air may be introduced at zones having a larger heat generation.

The arrangement described in the foregoing and shown in the drawings is only an embodiment of the invention and is not to be regarded as limitations, but the invention may be modified in a number of details within the scope of the following claims.

I claim:

1. A mobile refrigerating container of the type defined by insulated walls providing a roof, a floor, sides and ends, freezing or cooling machinery at one end of the container, a subroof within the container in spaced relation to the roof thereof to provide therebetween channels extending longitudinally of the container and a cargo compartment therebelow, said subroof having flow orifices providing communication between the channels and cargo compartment, said freezing or cooling machinery having a blower for directing cooled air through the channels and via the flow orifices into the cargo compartment, and said subroof being provided with openings at the pressure side of the blower and immediately downstream of the freezing or cooling machinery for injecting the warmer air of the cargo compartment into the cooled air directed through the channels by the blower.

2. The mobile refrigerating container as claimed in claim 1 in which the subroof is of a material capable of transmitting heat from the cargo compartment to the channels.

* * * * *